United States Patent [19]

Hayashihara et al.

[11] Patent Number: 5,895,797
[45] Date of Patent: Apr. 20, 1999

[54] POLYMER COMPOSITIONS AND USAGE THEREOF

[75] Inventors: Hiroshi Hayashihara; Kenji Shachi; Kazushige Ishiura, all of Tsukuba, Japan

[73] Assignee: Kuraray Co., Ltd., Kurashiki, Japan

[21] Appl. No.: 08/877,709

[22] Filed: Jun. 18, 1997

[51] Int. Cl.$^6$ .......................... C08L 53/00; C08F 216/06
[52] U.S. Cl. .................. 525/95; 525/60; 524/503; 524/505
[58] Field of Search ................. 524/503, 505; 525/60, 95

[56] References Cited

U.S. PATENT DOCUMENTS 5,134,036  7/1992  Uemura et al. ...................... 525/60

FOREIGN PATENT DOCUMENTS 0 572 667   12/1993  European Pat. Off. .
61-136561    6/1986  Japan .
5-212104     8/1993  Japan .
5-269201    10/1993  Japan .

*Primary Examiner*—Tae Yoon
*Attorney, Agent, or Firm*—Oblon, Spivak, McClelland, Maier & Neustadt, P.C.

[57] ABSTRACT

Disclosed is a polymer composition which comprises as the main components an ethylene-vinyl alcohol base copolymer (A) and a block copolymer (B) which has a polymer block containing an aromatic vinyl monomer unit and a polymer block containing an isobutylene unit, and in which a phase composed of said component (A) and a phase composed of said component (B) are separated each other. This polymer composition has good flexibility or rubber elasticity and also good barrier properties to gases or the like and it can be molded or formed into a product having such properties without a vulcanization step so that it is useful as a material for packaging material for food or drink, container packing, medical container for infusion fluid or the like.

9 Claims, No Drawings

POLYMER COMPOSITIONS AND USAGE THEREOF

BACKGROUND OF THE INVENTION

1. Field of the Invention

This invention relates a polymer composition comprising as main components an ethylene-vinyl alcohol base copolymer and a specific block copolymer and also to usage of said polymer composition.

2. Related Art of the Invention

Ethylene-vinyl alcohol base copolymers have come to be used for various applications such as food packaging materials because they have high-grade barrier properties against many gases and organic liquids and different from a polyvinylidene chloride resin or polyvinyl chloride resin, they do not emit harmful gases at the time of disposal by incineration. For example, in addition to the application to food packaging materials making use of high-grade gas-barrier properties, that to automobile gasoline tanks making use of high-grade barrier properties against an organic liquid are actualized or under investigation.

Ethylene-vinyl alcohol base copolymers, however, are inferior in flexibility so that they are generally used as a composition or laminate with a flexible resin such as a polyolefin.

Ethylene-vinyl alcohol base copolymers generally have low affinity and inferior compatibility with other resins so that a composition obtained by mixing an ethylene-vinyl alcohol base copolymer with a flexible resin tends to substantially lose the barrier properties which the copolymer originally has. The laminate formed of a layer of a flexible resin and a layer of the ethylene-vinyl alcohol base copolymer, on the other hand, has improved flexibility compared with the single layer of the ethylene-vinyl alcohol base copolymer but is insufficient in flexibility in some applications.

A tire tube for bicycles, a container packing for hermetic sealing between a beverage bottle and a crown cap therefor or hermetic sealing between a pharmaceutical bottle and a lid therefor or the like is requested to have both gas-barrier properties and flexibility or rubber elasticity. For example, IIR (butyl rubber) is generally used for the tire tube for bicycles to satisfy the high-grade gas-barrier properties and rubber elasticity necessary for the tire tube, while NR (natural rubber) or IIR is generally used for the container packing to satisfy the flexibility, rubber elasticity and gas-barrier properties necessary for the packing.

In order to allow molded or formed products, which have been obtained using the above-described NR or IIR, to manifest rubber elasticity, however, a cumbersome vulcanization step is added subsequent to a molding or forming step. Since NR has not so high gas-barrier properties, a container packing or the like obtained using it is disadvantageous in the long-term shelf stability of the contents enclosed in the container.

Proposed as a polymeric material having excellent flexibility and rubber elasticity and besides not requiring a vulcanization step are thermoplastic elastomers such as SEBS [polystyrene-poly(ethylene-butylene)-polystyrene triblock copolymer] and SEPS [polystyrene-poly(ethylene-propylene)-polystyrene triblock copolymer], but their gas-barrier properties are not always sufficient.

As another thermoplastic elastomer, a block copolymer having a polymer block of an aromatic vinyl monomer and a polymer block of isobutylene is known and its applications to a pharmaceutical rubber stopper, a pharmaceutical container and the like are proposed (Japanese Patent Application Laid-Open No. 5-212104 and Japanese Patent Application Laid-Open No. 5-269201). The gas-barrier properties of the above elastomer are however insufficient in some applications.

In European Patent Application Laid-Open No. 572,667, described is a process for improving impact resistance of a thermoplastic resin, which comprises incorporating 0.5 to 35 parts by weight of the above-described block copolymer having a polymer block of an aromatic vinyl monomer and a polymer block of isobutylene in 100 parts by weight of the thermoplastic resin. Examples of the thermoplastic resin include polycarbonate, polyphenylene ether, polystyrene, polyolefin, polyester, polyvinyl chloride, styrene-methacrylate-acrylonitrile copolymer, methacrylate-styrene copolymer, acrylonitrile-styrene copolymer, polymethyl methacrylate, polyphenylene sulfide and polyvinyl acetate. No description of an ethylene-vinyl alcohol base copolymer is included in it. In the above literature, it is described that the above resin composition composed of a thermoplastic resin and a block copolymer has good heat resistance, impact resistance, solvent resistance and compatibility but a description of barrier properties against gases or the like is not included.

SUMMARY OF THE INVENTION

An object of the present invention is to provide a novel polymeric material which is useful as a material for the preparation of a molded or formed product having good flexibility or rubber elasticity and good barrier properties against gases or the like without a vulcanization step.

Another object of the present invention is to provide various applications in which the above-described excellent properties can be exhibited effectively.

As a result of an extensive investigation, the present inventors have found that a polymer composition obtained by melting and kneading an ethylene-vinyl alcohol base copolymer and a specific isobutylene base block copolymer into a specific state permits the formation of a molded or formed product having both good barrier properties and good flexibility or rubber elasticity. They have proceeded with a further investigation and at last, completed the present invention.

In one aspect of the present invention, there is thus provided a polymer composition (which may hereinafter be called "polymer composition (C)"):

(1) which comprises as main components the following components (A) and (B):

Component (A): an ethylene-vinyl alcohol base copolymer, and

Component (B): a block copolymer which has a polymer block (b1) containing an aromatic vinyl monomer unit and a polymer block (b2) containing an isobutylene unit, and (2) in which a phase composed of the component (A) and a phase composed of the component (B) are separated each other.

In another aspect of the present invention, there are also provided applications of the above-described polymer composition (C), which will be described below in 1–12:

1. a molded or formed product, which comprises the above-described polymer composition, 2. a molded or formed product having a laminated structure comprising at least one layer composed of the above-described polymer composition and at least one layer composed of another material, 3. a packaging material for food and drink, which comprises at least one layer composed of the above-described polymer composition, 4. a container comprising at least one layer composed of the above-described polymer composition, 5. a bag in box having an internal bag, which comprises at least one layer composed of the above-described polymer composition, 6. a container packing comprising at least one layer composed of the above-described polymer composition, 7. a medical container for infusion fluid, which comprises at least one layer composed of the above-described polymer composition, 8. a storage tank for an organic liquid, which comprises at least one layer composed of the above-described polymer composition, 9. a transfer pipe for an organic liquid, which comprises at least one layer composed of the above-described polymer composition, 10. a hot-water pipe for heating, which comprises at least one layer composed of the above-described polymer composition, 11. a resin-made wall paper, which comprises at least one layer composed of the above-described polymer composition, and 12. a tire tube comprising the above-described polymer composition.

DETAILED DESCRIPTION OF THE INVENTION

The polymer composition (C) of the present invention comprises as main components the above-described components (A) and (B).

The ethylene-vinyl alcohol base copolymer (which will hereinafter be abbreviated as "EVOH"), which is the component (A) of the present invention, is a copolymer composed mainly of ethylene units (—CH$_2$CH$_2$—) and vinyl alcohol units (—CH$_2$—CH(OH)—). No particular limitation is imposed on EVOH usable in the present invention and those known to be used for molding or forming purpose can be given as examples of it. From the viewpoint of imparting the resulting polymer composition with high barrier properties and good moldability or formability, however, the content of ethylene units of EVOH is preferably 10 to 99 mole %, more preferably 20 to 75 mole %, more preferably 25 to 60 mole %, particularly 25 to 50 mole %. EVOH is, as will be described later, typically a saponification product of an ethylene-fatty acid vinyl ester base copolymer. In the case of the saponification product of an ethylene-fatty acid vinyl ester base copolymer, the saponification degree of fatty acid vinyl ester units is preferably at least 50 mole %, more preferably at least 90 mole %, more preferably at least 95 mole %, particularly at least 98 mole %, from the viewpoint of imparting the resulting EVOH with high barrier properties and heat stability.

The melt flow rate (as measured under the conditions of a temperature of 210° C. and a load of 2.16 kg in accordance with the method described in ASTM D1238) of EVOH is, from the viewpoint of good moldability or formability, preferably 0.1 to 100 g/10 min and more preferably 0.5 to 50 g/10 min, with 1 to 20 g/10 min being particularly preferred. The intrinsic viscosity of EVOH is preferably 0.1 to 5 dl/g and more preferably 0.2 to 2 dl/g at 30° C. in a mixed solvent of 85 wt. % of phenol and 15 wt. % of water.

In addition to ethylene units and vinyl alcohol units, EVOH may contain other structural units if their amounts are small (preferably 10 mole % or smaller relative to the total structural units). Examples of the other structural unit include units derived from α-olefins such as propylene, isobutylene, 4-methylpentene-1, 1-hexene and 1-octene; vinyl carboxylates such as vinyl acetate, vinyl propionate, vinyl versate, vinyl pivalate, vinyl valerate, vinyl caprate and vinyl benzoate; unsaturated carboxylic acids and derivatives thereof (ex. salt, ester, nitrile, amide or anhydride) such as itaconic acid, methacrylic acid, acrylic acid and maleic anhydride; vinyl silane base compounds such as vinyl trimethoxysilane; unsaturated sulfonic acids and salts thereof; and N-methylpyrrolidone. EVOH may have a functional group such as alkylthio at its terminal.

No particular limitation is imposed on the preparation method of EVOH. For example, EVOH is prepared by preparing an ethylene-fatty acid vinyl ester base copolymer, followed by saponification, in a manner known to date. The ethylene-fatty acid vinyl ester base copolymer can be obtained, for example, by polymerizing monomers composed mainly of ethylene and a fatty acid vinyl ester in an organic solvent such as methanol, t-butyl alcohol or dimethyl sulfoxide under pressure by using a radical polymerization initiator such as benzoyl peroxide or azobisisobutyronitrile. Examples of the fatty acid vinyl ester usable here include vinyl acetate, vinyl propionate, vinyl versate, vinyl pivalate, vinyl valerate and vinyl caprate. Among them, vinyl acetate is preferred. For saponification of an ethylene-fatty acid vinyl ester base copolymer, an acid catalyst or alkali catalyst can be used.

The above-described component (B) is a block copolymer (which will hereinafter be called "b1/b2 block copolymer") having a polymer block (b1) containing aromatic vinyl monomer units and a polymer block (b2) containing isobutylene units.

The aromatic vinyl monomer units, which are main structural units of the polymer block (b1), are units derived from an aromatic vinyl monomer by addition polymerization. Examples of the aromatic vinyl monomer include styrenes such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene and t-butoxystyrene; vinyl-containing aromatic compounds such as vinylnaphthalenes, e.g., 1-vinylnaphthalene and 2-vinylnaphthalene; and vinylene-containing aromatic compounds such as indene and acenaphthylene. The above aromatic vinyl monomer units constituting the polymer block (b1) may be used either singly or in combination. Among the polymer blocks (b1), particularly preferred is that composed of units derived from styrene.

The polymer block (b1) has preferably a number-average molecular weight of 2,500 to 400,000, with 5,000 to 200,000 being particularly preferred. When the number-average molecular weight of the polymer block (b1) is 2,500 or greater, particularly 5,000 or greater, the b1/b2 block copolymer has better mechanical properties, leading to the improvement in the mechanical properties of the composition with the component (A). When the number-average molecular weight of the polymer block (b1) is 400,000 or less, particularly 200,000 or less, the b1/b2 block copolymer has not too high melt viscosity, can be mixed easily with the component (A) and the resulting polymer composition has good moldability or formability.

The isobutylene units, which are main structural units of the polymer block (b2) of the b1/b2 block copolymer, are units (—C(CH$_3$)$_2$—CH$_2$—) derived from isobutylene by the addition polymerization. The number-average molecular weight of the polymer block (b2) is preferably 10,000 to 400,000. Number-average molecular weights of the polymer block (b2) not lower than 10,000 make it possible to impart particularly good barrier properties to the b1/b2 block copolymer, whereby the composition with the component (A) is also imparted with particularly good barrier properties. Number-average molecular weights of the polymer block (b2) not higher than 400,000, on the other hand, make it possible to impart good fluidity to the b1/b2 block copolymer, whereby the polymer composition with the component (A) is imparted with good moldability or formability.

The b1/b2 block copolymer having at least one polymer block (b1) and at least one polymer block (b2) has preferably a number-average molecular weight of 20,000 to 500,000, with 30,000 to 400,000 being particularly preferred. At the number-average molecular weight of the b1/b2 block copolymer not lower than 20,000, particularly not lower than 30,000, the b1/b2 block copolymer and also the polymer composition with the component (A) have improved mechanical properties such as strength and elongation. At the number-average molecular weight of the b1/b2 block copolymer not greater than 500,000, particularly not greater than 400,000, the b1/b2 block copolymer has improved fluidity, whereby the polymer composition with the component (A) has improved moldability or formability.

The preferable proportion of the polymer block (b1) to the polymer block (b2) in the b1/b2 block copolymer sometimes varies depending on the number-average molecular weight of each of the b1/b2 block copolymer, the polymer block (b1) and the polymer block (b2). In general, however, it is preferred that based on the weight of the b1/b2 block copolymer, the proportion of the polymer block (b1) is 5 to 80 wt. % and that of the polymer block (b2) is 95 to 20 wt. %, with the polymer block (b1) of 10 to 75 wt. % and the polymer block (b2) of 90 to 25 wt. % being more preferred. When the proportion of the polymer block (b1) is at least 5 wt. %, particularly at least 10 wt. %, the b1/b2 block copolymer and also the polymer composition with the component (A) have improved mechanical properties such as strength. When the proportion of the polymer block (b1) is 80 wt. % or lower, particularly 75 wt. % or lower, the melt viscosity does not become too high and the polymer composition with the component (A) has improved moldability or formability. Incidentally, when the b1/b2 block copolymer contains plural polymer blocks (b1) in its molecule, the sum of the wt. % of the plural polymer blocks is the above-described wt. % of the polymer block (b1). Similarly, when the b1/b2 block copolymer contains plural polymer blocks (b2) in its molecule, the sum of the wt. % of the plural polymer blocks is the above-described wt. % of the polymer block (b2).

It is only necessary that the b1/b2 block copolymer contains at least one polymer block (b1) and at least one polymer block (b2) in its molecule. No particular limitation is imposed on its structure. For example, the b1/b2 block copolymer may take any one of linear, branched and star-shaped molecular-chain forms. Incidentally, as a typical example of the b1/b2 block copolymer, that having a molecular chain structure represented by the following formula (I) or (II) can be given.

  (I)

  (II)

wherein Q represents an n-valent hydrocarbon group, b1 represents a polymer block (b1), b2 represents a polymer block (b2), $R^1$ and $R^2$ each, independently represents a $C_{1-20}$ alkyl or aralkyl group, k stands for 0 or 1 and m and n each independently represents an integer of 1 or greater, with the proviso that m is preferably 1.

According to a desired method, a functional group may be introduced into the b1/b2 block copolymer within an extent not impairing the performance of the polymer composition of the present invention. Examples of the functional group which can be introduced include hydroxyl, amino, alkylamino, epoxy, ether (ex. alkoxyl), carboxyl, ester (ex. alkoxycarbonyl or acyloxyl), amide (ex. carbamoyl, alkylcarbamoyl or acylamino) and a group (ex. maleic anhydride residue) having a structure of dicarboxylic anhydride.

No particular limitation is imposed on the preparation process of the b1/b2 block copolymer. It can be prepared, for example, by carrying out stepwise, in an inert solvent, the polymerization operation of a monomer composed mainly of an aromatic vinyl monomer and the polymerization operation of a monomer composed mainly of isobutylene in an optional order in accordance with the conventional manner by using a polymerization initiator system; and then modifying the reaction product as needed by using a compound containing a functional group or the like compound.

As the example of the polymerization initiator system usable here, a mixed system between a Lewis acid and an organic compound capable of forming a species active to cationic polymerization with the Lewis acid can be given. Examples of the Lewis acid usable include titanium tetrachloride, tin tetrachloride, boron trichloride and aluminum chloride. Examples of the organic compound capable of forming a species active to cationic polymerization with the Lewis acid include bis(1-methoxy-1-methylethyl)benzene, bis(1-acetoxy-1-methylethyl)benzene and bis(1-chloro-1-methylethyl)benzene. Together with the above-described Lewis acid and organic compound, a stabilizer for the species active to polymerization, for example, amides such as N,N-dimethylacetamide, esters such as ethyl acetate, pyridines and amines can be used as needed. In addition, as an inert solvent for polymerization, organic solvents such as hexane, cyclohexane, methylcyclohexane, methyl chloride or methylene chloride can be used.

The linear b1/b2 block copolymer can be prepared, for example, by (1) using as a polymerization initiator system a Lewis acid and an organic compound containing in its molecule one functional group capable of forming a species active to cationic polymerization, adding a monomer composed mainly of isobutylene to a reaction system to cause polymerization, thereby forming a polymer block (b2) and then polymerizing a monomer composed mainly of an aromatic vinyl monomer, thereby forming a polymer block (b1); or by (2) using as a polymerization initiator system a Lewis acid and an organic compound containing in its molecule two functional groups capable of forming a species active to cationic polymerization, polymerizing a monomer composed mainly of isobutylene, thereby forming a polymer block (b2), and then adding a monomer composed mainly of an aromatic vinyl monomer to the reaction system to cause polymerization, thereby forming polymer blocks (b1).

The star-shaped b1/b2 block copolymer can be prepared, for example, by using as a polymerization initiator system, a Lewis acid and an organic compound containing in its molecule at least three functional groups capable of forming a species active to cationic polymerization, polymerizing a monomer composed mainly of isobutylene, thereby forming a polymer block (b2) and then adding a monomer composed mainly of an aromatic vinyl monomer to the reaction system to cause polymerization, thereby forming polymer blocks (b1).

In the polymer composition according to the present invention, at least two EVOHs can be used as the component (A) and at least two b1/b2 block copolymers can be used as the component (B).

It is preferred that the polymer composition of the present invention contains the components (A) and (B) in a total amount of at least 55 wt. %, more preferably at least 70 wt. %, particularly at least 95 wt. %, in order to impart the polymer composition with both good flexibility or rubber elasticity and good barrier properties against gases or the like. Moreover, in the polymer composition of the present invention, it is preferred that weight ratio of the component (A) to the component (B) falls within a range of from 99:1 to 5:95 in order to impart the polymer composition with both good flexibility or rubber elasticity and good barrier properties against gases or the like.

In the polymer composition (C) according to the present invention, the component (A) and the component (B) form separate phases, respectively when microscopically observed, while they are uniformly distributed when macroscopically observed. Accordingly, the polymer composition (C) embraces the polymer compositions which will be described below in (i), (ii) and (iii).

(i) A polymer composition (which may hereinafter be called "polymer composition (C-1)") in which a phase composed of the component (A) forms a matrix phase and a phase composed of the component (B) forms a dispersed particle phase.

(ii) A polymer composition (which may hereinafter be called "polymer composition (C-2)") in which a phase composed of the component (A) forms a dispersed particle phase and a phase composed of the component (B) forms a matrix phase.

(iii) A polymer composition (which may hereinafter be called "polymer composition (C-3)") in which a phase composed of the component (A) and a phase composed of the component (B) are distributed, forming an interpenetrating network structure.

The polymer composition (C) of the present invention has both good flexibility or rubber elasticity and good barrier properties against gases or the like and has the merit that it can be molded or formed into a product having such properties without a vulcanization step. Such properties and merit are common to the above-polymer compositions (C-1), (C-2) and (C-3). In general, the polymer composition (C-1) tends to be excellent particularly in the barrier properties against many gases, organic liquids and the like, the polymer composition (C-2) tends to be excellent particularly in flexibility and rubber elasticity, and the polymer composition (C-3) has properties intermediate between them, although not necessarily limited thereto.

Whether the polymer composition containing the components (A) and (B) corresponds to the above-described polymer composition (C-1), in other words, whether the component (A) forms a matrix phase and the component (B) forms a dispersed particle phase can be confirmed, for example, by observing the composition under a scanning electron microscope (SEM) as follows. For example, the polymer composition is formed into a sheet of 1 mm thick, but not necessarily limited to such a shape, by compression molding under heating, followed by immersion in a liquid nitrogen under normal pressure to cool the sheet sufficiently. The sample is then taken out from the liquid nitrogen and is promptly ruptured. The sample so ruptured is immersed in toluene having 50 times the weight of the sample at 20° C. for 1 minute, whereby the rupture cross-section is etched [the component (B) is dissolved and removed] without causing physical damage. The cross-section is dried and then subjected to ion sputtering. By observing under SEM the rupture cross-section so treated to see that the vacancies (cavities) adjacent each other are substantially free (vacancies are substantially independent), it can be confirmed that the component (A) forms a matrix phase and the component (B) forms a dispersed particle phase.

Whether the polymer composition containing the components (A) and (B) corresponds to the above-described polymer composition (C-2), in other words, whether the component (A) forms a dispersed particle phase and the component (B) forms a matrix phase can be confirmed, for example, by observing the composition under SEM as follows. For example, the polymer composition is formed into a sheet of 1 mm thick, but not necessarily limited to such a shape, by compression molding under heating, followed by immersion in a liquid nitrogen under normal pressure to cool the sheet sufficiently. The sample is then taken out from the liquid nitrogen and is promptly ruptured. The sample so ruptured is immersed in a sufficient amount of a 8:2 (volume ratio) mixed solvent of isopropyl alcohol and water at 70° C. for 24 hours, whereby the rupture cross-section is etched (the component (A) is dissolved and removed) without causing physical damage. The cross-section is then dried then subjected to ion sputtering. By observing under SEM the rupture cross-section so treated to see that the vacancies (cavities) adjacent each other are substantially free (vacancies are substantially independent), it can be confirmed that the component (B) forms a matrix phase and the component (A) forms a dispersed particle phase.

Whether the polymer composition containing the components (A) and (B) corresponds to the above-described polymer composition (C-3), in other words, whether a phase composed of the component (A) and a phase composed of the component (B) forms an interpenetrating network structure can be confirmed, for example, based on the results of an immersion treatment in a solvent as follows. Described specifically, the sample of the polymer composition is immersed in toluene for a sufficient period of time (for example, immersion in toluene having 50 times the weight of the sample at 20° C. for one hour), whereby the component (B) can be extracted. On the other hand, another sample of the polymer composition is immersed in a 8:2 (volume ratio) mixed solvent of isopropyl alcohol and water for sufficient time (for example, immersion in the mixed solvent of isopropyl alcohol and water, said solvent having 50 times the weight of the sample, at 70° C. for 72 hours), whereby the component (A) can be extracted. So, if there remains a substance without being dissolved or dispersed in each of the above-described treatments, it can be judged that the phase composed of the component (A) and the phase composed of the component (B) each have been distributed in the integral form, in other words, they have been distributed in an interpenetrating network structure.

The polymer composition (C-1) has a matrix phase formed of the component (A) so that it effectively exhibits markedly high barrier properties against gases, organic liquids or the like, which are the properties originally possessed by the component (A). The polymer composition (C-1) contains, as a dispersed particle phase, the component (B) having both excellent flexibility and good gas-barrier properties in a matrix phase. of the component (A) so that it has by far improved flexibility compared with the single use of the component (A) while maintaining the excellent barrier properties of the component (A). In the polymer composition (C-1), no particular limitation is imposed on the particle size of the dispersed particles composed of the component (B), but the dispersed particles within the below-described range are generally preferred. As a sample, the polymer composition is molten and then subjected to compression molding to form a sheet of 1 mm thick. The sample is cooled, ruptured, etched, dried and then subjected to ion sputtering in a similar manner to the above operation used for the confirmation of the existence of a dispersed particle phase composed of the component (B). Based on the SEM observation, the semimajor axis of each of about 1000 vacancies formed by etching is measured. It is generally preferred that the mean value $|Ls=(\Sigma(n \cdot L))/(\Sigma(n))$ wherein n represents the number of vacancies of the semimajor axis L| of the simimajor axis falls within a range of from 0.01 to 100 μm. Incidentally, when the polymer composition (C-1) is in the form of a thin layer in the molded or formed product, the maximum length of the dispersed particles composed of the component (B) in the thickness direction of the thin layer should be set substantially smaller than the thickness of the layer. The half or less of the thickness of the layer is preferred, with the one-tenth or less being more preferred.

No particular limitation is imposed on the weight ratio of the component (A) to the component (B) in the polymer composition (C-1) insofar as the components (A) and (B) form a matrix phase and a dispersed particle phase, respectively. In order to attain excellent barrier properties against gases, organic liquids or the like and at the same time to attain proper flexibility, however, preferred weight ratio of the component (A) to the component (B) falls within a range of from 99:1 to 25:75.

The polymer composition (C-2) has a matrix phase formed of the component (B) so that it effectively exhibits excellent flexibility and rubber elasticity which are the properties originally possessed by the component (B). The polymer composition (C-2) contains, in the matrix phase of the component (B) having good gas-barrier properties, the component (A) having higher gas-barrier properties as a dispersed particle phase so that it has by far improved gas-barrier properties compared with the single use of the component (B). In the polymer composition (C-2), noparticular limitation is imposed on the particle size of the dispersed particles composed of the component (A), but the dispersed particles within the below-described range are generally preferred. The polymer composition is molten and then subjected to compression molding to form a sheet of 1 mm thick, which is provided for use as a sample. The sample so obtained is cooled, ruptured, etched, dried and then subjected to ion sputtering in a similar manner to the above operation used for the confirmation of the existence of a dispersed particle phase composed of the component (A). Based on the SEM observation, the semimajor axis of each of about 1000 vacancies formed by etching is measured. It is generally preferred that the mean value $|Ls=(\Sigma(n \cdot L))/(\Sigma(n))$ wherein n represents the number of vacancies of the semimajor axis L| falls within a range of from 0.01 to 100 μm. Incidentally, when the polymer composition (C-2) is in the form of a thin layer in the molded or formed product, the maximum length of the dispersed particles composed of the component (A) in the thickness direction of the thin layer should be set substantially smaller than the thickness of the layer. The half or less of the thickness of the layer is preferred, with the one-tenth or less being more preferred.

No particular limitation is imposed on the weight ratio of the component (A) to the component (B) in the polymer composition (C-2) insofar as the components (A) and (B) form a dispersed particle phase and a matrix phase, respectively. In order to attain excellent flexibility and rubber elasticity and at the same time to attain proper gas-barrier properties, however, preferred weight ratio of the component (A) to the component (B) falls within a range of from 50:50 to 5:95.

In the polymer composition (C-3), a phase composed of the component (A) having markedly high barrier properties against gases, organic liquids or the like and a phase composed of the component (B) having good barrier properties against gases or the like have been distributed uniformly, forming a network structure so that the composition can exhibit excellent barrier properties. In addition, the polymer composition (C-3) has a structure in which a continuous phase composed of the component (B) having excellent flexibility has interpenetrated into the network of the phase composed of the component (A) so that it can exhibit excellent flexibility while maintaining good strength.

In the polymer composition (C-3), for attaining excellent barrier properties against gases, organic liquids or the like and excellent flexibility at the same time, preferred weight ratio of the component (A) to the component (B) falls within a range of from 85:15 to 15:85, more preferably a range of from 80:20 to 20;80, particularly a range of from 65:35 to 35:65. In the polymer composition (C-3), the component (A) contained in the polymer composition substantially corresponds to undissolved and undispersed portions remaining after immersion of the polymer composition in toluene, having 50 times the weight of the composition, at 20° C. for one hour as described above. The component (B) contained in the polymer composition, on the other hand, corresponds to undissolved and undispersed portions remaining after immersion of the polymer composition in a 8:2 (volume ratio) mixed solvent of isopropyl alcohol and water, said solvent having 50 times the weight of the composition, at 70° C. for 72 hours. It is therefore possible to know the approximate weight ratio of the component (A) to the component (B) based on the weights of the undissolved and undispersed portions obtained by the above two immersion treatments, respectively. No particular limitation is imposed on the shape of the sample provided for the above immersion treatment using toluene or a mixed solvent of isopropyl alcohol and water. It is however possible to use a strip having a predetermined weight (e.g. 1.00 g) obtained by compression molding the polymer composition into a sheet of 1 mm thick under heating and then cutting the resulting sheet. In the immersion treatment, a predetermined solvent is used in an amount 50 times the weight of the sample (for example, 50.0 g when the weight of the sample is 1.00 g). The immersion treatment is effected by placing the sample so that the whole portion of the sample is covered with the solvent and then allowing to stand it at a predetermined temperature for a predetermined time (at 20° C. for one hour or at 70° C. for 72 hours). After a predetermined time, the remaining portion of the sample is taken out gently. During the immersion treatment, a portion of the sample is sometimes extracted or dispersed in the solvent. The remaining portion to be taken out is not a portion which has been extracted or dispersed but a portion remaining as substantially a mass after immersion treatment (i.e. a portion remaining as undissolved or undispersed). After the remaining portion is taken out, the solvent is evaporated therefrom, followed by the measurement of the weight. The proportion of the weight so measured to the initial weight of the sample is an approximate value of the ratio (based on weight) of the component (A) or (B) in the polymer composition (C-3). In accordance with the proportion so obtained, the weight ratio of the component (A) to the component (B) can be found.

The polymer composition (C) of the present invention is composed mainly of the component (A) and the component (B) but it is possible to add another polymer or an additive as needed within an extent not substantially impairing the effects of the present invention. Examples of another polymer which can be added to the polymer composition (C) include rubbers such as EPR (ethylene-propylene base rubber), EPDM (ethylene-propylene-diene base rubber), NR (natural rubber), isoprene rubber, butadiene rubber and IIR (butyl rubber); and resins such as polyethylene, polypropylene, polybutene, polyisobutylene, polyamide and polyester. Examples of the additive usable in the present invention include mineral oils or softening agents for the improvement of the fluidity at the molding or forming time; inorganic powdery fillers; fibrous fillers such as glass fiber and metal fiber; heat stabilizers; antioxidants; light stabilizers; tackifiers; antistatic agents; and blowing agents. The above-exemplified polymer or additive may be contained in any one of the phase composed of the component (A), the phase composed of the component (B) and another phase. When the phase composed of the component (A) contains an acid or partial salt of a polybasic acid such as phosphoric acid, pyrophosphoric acid, phosphorous acid, oxalic acid, succinic acid, adipic acid, tartaric acid, citric acid, sodium dihydrogen phosphate, potassium dihydrogen phosphate or acetic acid, gelation of EVOH at the melting and kneading time for the preparation of the polymer composition or at the time of melt forming the polymer composition is sometimes suppressed, whereby the deterioration of color tone can be prevented.

No particular limitation is imposed on the preparation process of the polymer composition (C) of the present invention, but it can be prepared, for example, by kneading predetermined amounts of the components (A) and (B) optionally with a small proportion of another polymer and/or an additive under the melting conditions and under a sufficient shear force. Upon preparation, it is desired to select in advance the melt viscosity and using ratio of each component experimentally in order that the components (A) and (B) can form predetermined phase structures, respectively. Kneading under the melting conditions can be carried out using a known mixing or kneading apparatus such as kneader extruder, mixing roll or Banbury mixer. It is preferred that the temperature upon kneading may be adjusted as needed according to the melting point of the component (A) to be employed but the temperature falling within a range of from 110 to 300° C. is generally preferred.

For example, the polymer composition (C-3) tends to be prepared when $\phi A$, $\phi B$, $\eta A$ and $\eta B$ satisfy the below-described formulas (f1), (f2) and (f3), supposing that $\phi A$ (wt. %) and $\phi B$ (wt. %) represent desired contents of the components (A) and (B) provided for melting and kneading, respectively; and $\eta A$ (poise) and $\eta B$ (poise) represent their melt viscosities, respectively under the conditions of a temperature of 230° C. and a shear rate of 100 sec$^{-1}$.

$15 \leq \phi A \leq 85$ (f1)

$15 \leq \phi B \leq 85$ (f2)

$1.0 \leq (\phi B/\phi A) \times (\eta A/\eta B) \leq 8.0$ (f3)

It is preferred, but not necessarily limited to, that the content $\phi A$ of the component (A) is selected from a range of 15 to 85 wt. %, more preferably from a range of 20 to 80 wt. %, particularly from a range of 35 to 65 wt. % in consideration of the availability of the polymer composition (C-3).

Similarly, it is preferred that the content $\phi B$ of the component (B) is selected from a range of from 15 to 85 wt. %, more preferably 20 to 80 wt. %, particularly from a range of 35 to 65 wt. %. It is preferred, but not necessarily limited to, that the sum of the content $\phi A$ of the component (A) and the content $\phi B$ of the component (B) falls within a range of from 70 to 100 wt. %, more preferably 80 to 100 wt. %, particularly 95 to 100 wt. %.

The polymer composition (C) of the present invention can be used as a molding or forming material after desirably formed into pellets, powders or the like. Because of having thermoplasticity, the polymer composition of the present invention can be molded or formed by the method or apparatus ordinarily used for the molding or forming of a general thermoplastic polymer. Examples of the molding or forming method include injection molding, extrusion, compression molding, blow molding, calendering and vacuum molding and any one of them can be employed as needed. Molded or formed products produced by the above method from the polymer composition of the present invention embrace those in various shapes such as molded products, pipes, sheets, films, discs, rings, bag-shaped products, bottle-shaped products, string-shaped products and fibrous products. They also embrace molded or formed products having a laminate or composite structure with another material. It is also possible to improve moistureproofness or mechanical properties of the molded or formed product by adopting a laminated structure with another material.

Upon production of a molded or formed product having a laminated structure formed of at least one layer composed of the polymer composition of the present invention and at least one layer composed of another material, it is only necessary to select as another material a proper one according to the properties required, expected applications or the like. Examples of another material include thermoplastic polymers, for example, polyolefins such as high-density polyethylene, medium-density polyethylene, low-density polyethylene, linear low-density polyethylene, ethylene-propylene copolymer and propylene, ionomers, ethylene-vinyl acetate copolymer (EVA), ethylene-acrylate copolymer (EEA), polystyrene (PS), polyvinyl chloride resin (PVC) and polyvinylidene chloride resin (PVDC).

In the molded or formed product having a laminated structure, it is also possible to interpose an adhesive layer between a layer composed of the polymer composition of the present invention and a base material layer composed of another material. By interposing an adhesive layer, two layers on both sides thereof can be firmly joined and integrated. Examples of the adhesive used for the adhesive layer include acid anhydride modified products of a diene base polymer; acid anhydride modified products of a polyolefin; and mixtures between a polymeric polyol (for example, a polyester polyol available by polycondensation of a glycol compound such as ethylene glycol or propylene glycol and a dibasic acid such as adipic acid; partially saponified product of a copolymer between vinyl acetate and vinyl chloride) and a polyisocyanate compound [for example, a 1:2 (molar ratio) reaction product of a glycol compound such as 1,6-hexamethylene glycol and a diisocyanate compound such as 2,4-tolylene diisocyanate; or a 1:3 (molar ratio) reaction product of a triol compound such as trimethylolpropane and a diisocyanate compound such as 2,4-tolylene diisocyanate]. Incidentally, for the formation of a laminated structure, a method known to date such as co-extrusion, co-injection, extrusion coating or the like can also be employed.

The molded or formed product composed of the polymer composition (C) of the present invention has both good flexibility or rubber elasticity and good barrier properties against gases or the like so that it can be applied to daily necessities, packaging materials and mechanical parts which are required to have such properties. Examples of the application of the molded or formed product composed of the polymer composition (C) of the present invention which application effectively exhibits characteristics derived from the polymer composition include packaging material for food or drink, container packing and medical container for infusion fluid.

Among the polymer compositions (C) according to the present invention, a molded or formed product composed of a polymer composition (C-1) or (C-3) is particularly excellent in barrier properties against many gases or organic liquids so that it is particularly suited for the applications such as packaging material for food or drink, container, internal bag for bag in box, container packing, medical container for infusion fluid, storage tank for organic liquids, transfer pipe for organic liquids, hot-water pipe for heating (e.g. hot-water pipe for floor heating) and resin-made wall paper. In a molded or formed product used for the above-exemplified applications, the polymer composition (C) of the present invention, preferably the polymer composition (C-1) or (C-3), may form at least one layer and such a structure can be selected from a single-ply structure composed of said polymer composition and a laminated structure in which at least one layer composed of the polymer composition and at least one layer composed of another material have been stacked one after another. When used for the packaging material for food or drink, container, internal bag for bag in box, container packing or medical container for infusion fluid, the polymer composition of the present invention can prevent the permeation of an oxygen gas in the air and permeation of volatile components in the contents, thereby bringing about excellent long-term shelf stability of contents. When the polymer composition is used for the storage tank or transfer pipe, each for organic liquids, an organic liquid such as aliphatic hydrocarbon, ketone or gasoline, or vapor therefrom can be packed hermetically. The composition has thus a function similar to a metal tank or metal pipe. Moreover, the composition makes it possible to reduce the weight of the tank or pipe compared with that of the metal tank or pipe and owing to ease in molding or forming, it can be formed freely. When used for the hot-water pipe for heating, the polymer composition makes it possible to prevent the deterioration of the pipe caused by the penetration of hot water and generation of stress cracks even in long-term service, whereby hot-water leakage can be prevented. When used for the resin-made wall paper, the layer composed of the polymer composition of the present invention laminated with a base material layer composed of a flexible resin such as polyvinyl chloride resin makes it possible to prevent bleeding of the plasticizer in the flexible resin to the surface of the wall paper, resulting in the prevention of the generation of stains on the surface.

The molded or formed product made of the polymer composition (C-2), among the polymer compositions (C) of the present invention, is particularly excellent in flexibility and rubber elasticity so that it is especially suited for the applications such as packaging material for food or drink, container packing, medical container for infusion fluid and tire tube.

Incidentally, scraps of the molded or formed product made of the polymer composition (C) of the present invention can be provided for reuse after being molten and optionally being added with the component (A) and/or component (B).

The present invention will hereinafter be described more concretely by the examples. It should however be borne in mind that the present invention is not limited to or by the examples.

Incidentally, in the Synthesis Examples which will be describe later, the number-average molecular weight of the block copolymer was determined by GPC (gel permeation chromatography), the number-average molecular weight of each block of the block copolymer was determined based on GPC of polyisobutylene which is an intermediate for the synthesis of the block copolymer, and a content of styrene units in the block copolymer was determined from $^1$H-NMR. Melt viscosities of EVOHs and block copolymers under the conditions of a temperature of 230° C. and shear rate of 100 sec$^{-1}$ were measured using a capillary viscometer ("Capirograph 1C", trade name; product of Toyo Seiki Seisaku-Sho, Ltd.).

EVOHs used in Examples will hereinafter be expressed by the following abbreviations.

EVOH(S): a saponified product of an ethylene-vinyl acetate copolymer which has an ethylene unit content of 32 mole %, has a saponification degree of 99 mole % and a melt viscosity of 1000 poises under the conditions of a temperature of 230° C. and a shear rate of 100 sec$^{-1}$.

EVOH(T): a saponified product of an ethylene-vinyl acetate copolymer which has an ethylene unit content of 44 mole %, has a saponification degree of 99 mole % and a melt viscosity of 480 poises under the conditions of a temperature of 230° C. and a shear rate of 100 sec$^{-1}$.

EVOH(U): "EVAL EP-H101", trade name; product of Kuraray Co., Ltd.

EVOH(V): "EVAL EP-H105", trade name; product of Kuraray Co., Ltd.

SYNTHESIS EXAMPLE 1

A reactor equipped with a stirrer, said reactor having been purged with nitrogen, was charged with a mixed solvent of 1,060 parts by weight of methylene chloride and 920 parts by weight of methylcyclohexane and a polymerization initiator system composed of 2.7 parts by weight of titanium tetrachloride and 0.91 part by weight of 1,4-bis(1-methoxy-1-methylethyl)benzene, followed by the charging of 150 parts by weight of isobutylene under cooling at −65° C. The resulting mixture was polymerized for 4 hours at the same temperature. To the polymer so prepared, 0.08 part by weight of dimethylacetamide and 38 parts by weight of styrene were added and they were polymerized for further four hours under cooling at −65° C. The reaction mixture so obtained was reprecipitated in methanol, whereby a styrene-isobutylene-styrene triblock copolymer (i) was prepared.

The number-average molecular weight of the resulting triblock copolymer (i), the number-average molecular weight of each block, styrene content and melt viscosity under the conditions of a temperature of 230° C. and a shear rate of 100 sec$^{-1}$ are shown below in Table 1.

SYNTHESIS EXAMPLES 2 and 3

In Synthesis Examples 2 and 3, in a similar manner to Synthesis Example 1 except that the charging ratios of styrene, isobutylene and 1,4-bis (1-methoxy-1-methylethyl) benzene were changed, styrene-isobutylene-styrene triblock copolymers (ii) and (iii) were prepared. The number-average molecular weight of each of the resulting triblock copolymers (ii) and (iii), the number-average molecular weight of each block, styrene content and melt viscosity under the conditions of a temperature of 230° C. and a shear rate of 100 sec$^{-1}$ are shown below in Table 1.

TABLE 1

| Synthesis Example | Triblock copolymer | Number-average molecular weight of copolymer | Number-average molecular weight of polystyrene block | Number-average molecular weight of polyisobutylene block | Styrene content (wt %) | Melt viscosity ηB (poise) |
|---|---|---|---|---|---|---|
| 1 | (i) | 25,000 | 2,500 | 20,000 | 20 | 130 |
| 2 | (ii) | 37,000 | 5,500 | 26,000 | 30 | 770 |
| 3 | (iii) | 65,000 | 8,000 | 49,000 | 25 | 1500 |

EXAMPLES 1–5 [Preparation of polymer composition (C-1)]

In each of Examples 1 to 5, the triblock copolymer [(i), (ii) or (iii)] and EVOH [(U) or (V)] were mixed at a ratio as shown below in Table 2. By a small-sized twin-screw extruder, the resulting mixture was kneaded in a molten state at 200° C., followed by extrusion. The resulting extrudate was cut, whereby a polymer composition was prepared in the form of pellets.

The pellets so obtained were compression molded under heating by a compression molding machine, whereby test sheets having a thickness of 1 mm and 100 μm were formed. Hardness (JIS D) and oxygen permeability of these test sheets were measured. The measurement of the hardness was carried out in accordance with JIS K7215. The oxygen permeability was measured using a gas permeability measuring equipment ("GTR-10", trade name; product of Yanagimoto Mfg. Co., Ltd.) under the conditions of an oxygen pressure of 3.5 kg/cm$^2$, temperature of 35° C. and humidity of 0% RH.

In accordance with the above-described procedure, the pellets were compression molded into a sheet of 1 mm thick under heating by a compression molding machine. The sheet was cooled with liquid nitrogen and then ruptured. After the ruptured cross-section was etched with toluene for one minute, dried and then subjected to ion sputtering, it was observed under a scanning electron microscope ("S-2150", trade name; product of Hitachi, Ltd.). As a result, it was confirmed that the triblock copolymer was dispersed in the particulate form in the matrix of EVOH. In addition, a semimajor axis of each of about 1000 vacancies formed by the dissolution and removal of the triblock copolymer through etching was measured and based on the measured value, the mean value of semimajor axis |Ls=(Σ(n·L))/(Σ(n)) wherein n represents the number of vacancies of the semimajor axis L| was determined.

Measurement results so obtained are shown in Table 2.

COMPARATIVE EXAMPLES 1–3

In each of Comparative Examples 1–3, in a similar manner to Example 1 except that a sheet formed of polyamide ("UBE NYLON 1013B", trade name; product of Ube Industries, Ltd.) alone, a polymer composition composed of EVOH (U) and an isoprene-styrene base block copolymer (SEPS) ("SEPTON 2002", trade name; product of Kuraray Co., Ltd.) or EVOH (V) alone was used instead of the sheet made of the polymer composition, hardness and oxygen permeability were measured.

The measurement results are shown in Table 2.

TABLE 2

| | Components of composition (wt. %) | | | | | | | Values measured | | |
|---|---|---|---|---|---|---|---|---|---|---|
| | Block copolymer | | | EVOH | | Polyamide | SEPS | Hardness | Oxygen permeability | average of semimajor axis |
| | (i) | (ii) | (iii) | (U) | (V) | 1013B | 2002 | JIS D | (cc · 20 μm/m$^2$ · day · atm) | (μm) |
| Ex. 1 | 10 | 0 | 0 | 90 | 0 | 0 | 0 | 79 | 0.6 | 0.5 |
| Ex. 2 | 0 | 30 | 0 | 70 | 0 | 0 | 0 | 74 | 1 | 1 |
| Ex. 3 | 0 | 30 | 0 | 0 | 70 | 0 | 0 | 71 | 5 | 2 |
| Ex. 4 | 0 | 50 | 0 | 0 | 50 | 0 | 0 | 57 | 9 | 2.5 |
| Ex. 5 | 0 | 0 | 65 | 0 | 35 | 0 | 0 | 52 | 26 | 10 |
| Comp. Ex. 1 | 0 | 0 | 0 | 0 | 0 | 100 | 0 | 84 | 250 | — |
| Comp. Ex. 2 | 0 | 0 | 0 | 50 | 0 | 0 | 50 | 62 | 3200 | — |
| Comp. Ex. 3 | 0 | 0 | 0 | 0 | 100 | 0 | 0 | 88 | 3 | — |

From the above Table 2, it has been found that the polymer composition (C-1) of the present invention in each of Examples 1–5 has excellent gas-barrier properties as can be seen from an oxygen permeability less than 30 cc·20 μm/m$^2$·day·atm and at the same time, has good flexibility as can be seen from JIS D hardness of 50 to 80. On the other hand, it has been found that the polyamide in Comparative Example 1 has insufficient flexibility judging from the JIS D hardness of it as high as 84. In the case of the polymer composition between EVOH and isoprene-styrene base block copolymer in Comparative Example 2, it has been found that the gas-barrier properties of it were insufficient judging from the oxygen permeability as high as 3200 cc·20 μm/m$^2$·day·atm. In the case of the sheet composed of EVOH alone in Comparative Example 3, it has been found that the flexibility of it was insufficient judging from the JIS D hardness as high as 88.

EXAMPLES 6–10

[Preparation of polymer composition (C-2)]

In each of Examples 6–10, EVOH [(U) or (V)] and a triblock copolymer [(i), (ii) or (iii)] were mixed at a ratio shown below in Table 3. The resulting mixture was kneaded in a molten state at 200° C. and then extruded by a small-sized twin-screw extruder. The extrudate so obtained was cut, whereby the polymer composition was prepared in the form of pellets.

The pellets so obtained were compression molded under heating by a compression molding machine, whereby a test sheet of 1 mm thick was produced. The hardness (JIS A) of the test sheet was measured in accordance with JIS K 6301. Another test sheet of 1 mm thick, which had been prepared in a similar manner, was marked with marked lines (distance between marked lines: $L_0$) for the measurement of tensile elongation. The sheet was drawn at room temperature for about 15 seconds until an elongation reached half of the elongation at break in accordance with the tensile test based on JIS K6301 [the half value: $L_{0.5}=(\frac{1}{2})(L_1$(distance between marked lines at break)$-L_0)$], in other words, until the distance between marked lines became $L_0+L_{0.5}$. After the sheet was maintained at the same temperature for 10 minutes, it was contracted by the removal of the external force, and allowed to stand at the same temperature for 10 minutes. The distance between marked lines (E) was then measured, from which elongation set $\{PS(\%)=|(E-L_0)/L_{0.5}|\times 100\}$ was determined.

In addition, pellets were compression molded under heating by a compression molding machine, whereby a sheet of 100 μm thick was prepared. The sheet so obtained was provided for the measurement of the oxygen permeability.

Measurement results so obtained are shown in Table 3.

COMPARATIVE EXAMPLES 4–9

In each of Comparative Examples 4–9, in a similar manner to Example 6 except that a sheet formed of the triblock copolymer (i) alone, EVOH (V) alone, polyethylene terephthalate (PET) ("KURAPET 1030", trade name; product of Kuraray Co., Ltd.) alone, polyamide ("UBE NYLON 1013B", trade name; product of Ube Industries, Ltd.) alone, vulcanized NR alone ("Ribbed Smoked Sheet RSS No. 1") or a polymer composition composed of an isoprene-styrene base block copolymer (SEPS) ("SEPTON 2002", trade name; product of Kuraray Co., Ltd.) and EVOH was used instead of the sheet made of the polymer composition, hardness, elongation set and oxygen permeability were measured.

The measurement results are shown in Table 3.

TABLE 3

| | Components of composition (wt. %) | | | | | | | | | | Values measured | | |
|---|---|---|---|---|---|---|---|---|---|---|---|---|---|
| | Block copolymer | | | EVOH | | PET 103 | Poly-amide | NR RSS | SEPS | Hard-ness JIS A | Elongation set (%) | Oxygen permeability (cc · 20 μm/m² · day · atm) | Ls: Average of semi-major axis of vacancy (μm) |
| | (i) | (ii) | (iii) | (U) | (V) | 0 | 1013B | No. 1 | 2002 | | | | |
| Ex. 6 | 60 | 0 | 0 | 40 | 0 | 0 | 0 | 0 | 0 | 62 | 16.5 | 1200 | 6 |
| Ex. 7 | 55 | 0 | 0 | 45 | 0 | 0 | 0 | 0 | 0 | 68 | 18.8 | 1100 | 5 |
| Ex. 8 | 0 | 0 | 80 | 20 | 0 | 0 | 0 | 0 | 0 | 55 | 13.6 | 1800 | 2 |
| Ex. 9 | 55 | 0 | 0 | 0 | 45 | 0 | 0 | 0 | 0 | 79 | 18.5 | 1200 | 6 |
| Ex. 10 | 0 | 60 | 0 | 40 | 0 | 0 | 0 | 0 | 0 | 70 | 15.2 | 1400 | 4 |
| Comp. Ex. 4 | 100 | 0 | 0 | 0 | 0 | 0 | 0 | 0 | 0 | 38 | 10.1 | 5800 | — |
| Comp. Ex. 5 | 0 | 0 | 0 | 0 | 100 | 0 | 0 | 0 | 0 | 100 | 85(N) | 3 | — |
| Comp. Ex. 6 | 0 | 0 | 0 | 0 | 0 | 100 | 0 | 0 | 0 | 100 | 88(N) | 45 | — |
| Comp. Ex. 7 | 0 | 0 | 0 | 0 | 0 | 0 | 100 | 0 | 0 | 100 | 84(N) | 80 | — |
| Comp. Ex. 8 | 0 | 0 | 0 | 0 | 0 | 0 | 0 | 100 | 0 | 65 | 1.0 | 75000 | — |
| Comp. Ex. 9 | 0 | 0 | 0 | 40 | 0 | 0 | 0 | 0 | 60 | 75 | 20.2 | 6200 | — |

Using a gas permeability measuring equipment ("GTR-10", trade name; product of Yanagimoto Mfg. Co., Ltd.), the oxygen permeability was measured under the conditions of an oxygen pressure of 3.5 kg/cm², temperature of 35° C. and humidity of 0% RH.

Furthermore, the above-described pellets were compression molded under heating by a compression molding machine, whereby a sheet of 1 mm thick was prepared. The sheet was cooled with liquid nitrogen and then ruptured. The ruptured cross-section was etched for 24 hours with a 8:2 (volume ratio) mixed solvent of isopropyl alcohol and water at 70° C., dried and then subjected to ion sputtering. The ruptured cross-section was thereafter observed under SEM (scanning electron microscope), whereby it has been confirmed that EVOH was dispersed in the particulate form in the matrix of the triblock copolymer. In addition, a semimajor axis of each of about 1000 vacancies formed through etching was measured and based on the measured value, the mean value of semimajor axis $|Ls=(\Sigma(n \cdot L))/(\Sigma(n))$ wherein n represents the number of vacancies of the semimajor axis L| was determined.

In the above Table, (N) in the column of elongation set indicates that necking appeared at the time of elongation and the neck remained almost as it was even after the external force was removed.

As can be understood from Table 3, the polymer composition (C-2) of the present invention in each of Examples 6 to 10 indicated JIS A hardness of 55 to 80, thus having excellent flexibility; elongation set of about 10 to 20%, thus having excellent rubber elasticity; and an oxygen permeability less than 2000 cc·20 μm/m²·day·atm, thus having good gas-barrier properties. In the case of the isobutylene-styrene base block copolymer alone in Comparative Example 4, the NR alone in Comparative Example 8 and the polymer composition of the isoprene-styrene base block copolymer and EVOH in Comparative Example 9, on the other hand, it has been found that their gas-barrier properties are inferior to those of the polymer compositions in Examples 6 to 10 judging from the oxygen permeability not lower than 5000 cc·20 μm/m²·day·atm. It has also been found that any one of the sheets composed of EVOH alone in Comparative Example 5, the PET alone in Comparative Example 6 and the polyamide alone in Comparative Example 7 indicated JIS A hardness of 100, thus having insufficient flexibility; and also has insufficient rubber elasticity judging from the elongation set not lower than 80% and appearance of unrecoverable necking.

EXAMPLES 11–15
[Preparation of polymer composition (C-3)]

In each of Examples 11 to 15, at a ratio as shown below in Table 4, EVOH [(S) or (T)] and a triblock copolymer [(i), (ii) or (iii)] were mixed. In a small-sized twin-screw extruder, the resulting mixture was kneaded in a molten state at 200° C. and then extruded. The extrudate so obtained was cut, whereby the polymer composition was prepared in the form of pellets.

The pellets so obtained were compression molded under heating by a compression molding machine to prepare test sheets of 1 mm thick and 100 μm thick, respectively. The hardness (JIS D) and oxygen permeability of those sheets were measured. The measurement of the hardness was carried out in accordance with JIS K7215. The oxygen permeability was measured using a gas permeability measuring device ("GTR-10", trade name; product of Yanagimoto Mfg. Co., Ltd.) under the conditions of an oxygen pressure of 3.5 kg/cm$^2$, temperature of 35° C. and humidity of 0% RH.

In accordance with the above-described procedure, the above-described pellets were compression molded into a sheet of 1 mm thick under heating by a compression molding machine. The sheet was cut into strips, whereby strip-shaped samples having 1.00 g weight were prepared. The samples so obtained were immersed in toluene having 50 times the weight of the sample, at 20° C. for one hour, whereby the proportion of the portion remained undissolved and undispersed was found. While another sample was immersed in a 8:2 (volume ratio) mixed solvent of isopropyl alcohol and water, said solvent having 50 times the weight of the sample, at 70° C. for 72 hours, the proportion of the portion remained undissolved and undispersed was found.

The measurement results so obtained are shown in Table 4.

COMPARATIVE EXAMPLES 10–13

In each of Comparative Examples 10 to 13, in a similar manner to Example 11 except that a sheet formed of polyamide ("UBE NYLON 1013B", trade name; product of Ube Industries, Ltd.) alone, a polymer composition composed of EVOH(S) and an isoprene-styrene base block copolymer (SEPS) ("SEPTON 2002", trade name; product of Kuraray Co., Ltd.), EVOH(S) alone or block copolymer (ii) alone was used instead of the sheet made of the polymer composition, hardness and oxygen permeability were measured and also the remaining proportion after immersion treatment was determined.

The measurement results are shown in Table 4.

TABLE 4

| | Components of composition (wt. %) | | | | | | | Calculated | Immersion in solvent Remaining ratio after treatment (wt. %) | | measured | |
|---|---|---|---|---|---|---|---|---|---|---|---|---|
| | EVOH [φA] | | Block copolymer [φB] | | | Poly- | | | | | Hard- | Oxygen permeability |
| | (S) ηA = 1000 | (T) ηA = 480 | (i) ηB = 130 | (ii) ηB = 770 | (iii) ηB = 1500 | amide 1013B | SEPS 2002 | φB/φA × ηA/ηB | Toluene | Isopropyl alcohol/ water | ness JIS D | (cc · 20 μm/m$^2$ · day · atm) |
| Ex. 11 | 70 | 0 | 30 | 0 | 0 | 0 | 0 | 3.3 | 70 | 30 | 47 | 120 |
| Ex. 12 | 50 | 0 | 0 | 50 | 0 | 0 | 0 | 1.3 | 50 | 50 | 41 | 220 |
| Ex. 13 | 50 | 0 | 50 | 0 | 0 | 0 | 0 | 7.7 | 50 | 50 | 38 | 340 |
| Ex. 14 | 30 | 0 | 0 | 0 | 70 | 0 | 0 | 1.6 | 30 | 70 | 37 | 670 |
| Ex. 15 | 0 | 20 | 0 | 0 | 80 | 0 | 0 | 1.3 | 20 | 80 | 35 | 830 |
| Comp. Ex. 10 | 0 | 0 | 0 | 0 | 0 | 100 | 0 | — | — | — | 84 | 250 |
| Comp. Ex. 11 | 50 | 0 | 0 | 0 | 0 | 0 | 50 | — | — | — | 62 | 3200 |
| Comp. Ex. 12 | 100 | 0 | 0 | 0 | 0 | 0 | 0 | — | 100 | 0 | 84 | 0.3 |
| Comp. Ex. 13 | 0 | 0 | 0 | 100 | 0 | 0 | 0 | — | 0 | 100 | <20 | 5700 |

From Table 4, it has been found that the composition (C-3) of the present invention in each of Examples 11 to 15 has good gas-barrier properties judging from the oxygen permeability of about 100 to about 1000 cc·20 μm/m$^2$·day·atm and besides, has good flexibility judging from the JIS D hardness of 30 to 50. It has also been found that in the polymer composition of the present invention in each of the above Examples, the components (A) and (B) each independently forms a continuous phase, because there remained an undissolved and undispersed portion after immersion treatment in a solvent of toluene and also in a mixed solvent of isopropyl alcohol and water.

As can be understood from Table 4, the sheet made of the polyamide in Comparative Example 10 has the JIS D hardness as high as 80, which indicates insufficient flexibility. It has been found that the polymer composition of EVOH and isoprene-styrene base bock copolymer has insufficient gas-barrier properties as indicated by the oxygen permeability as high as 3200 cc·20 μm/m$^2$·day·atm. It has also been found that the sheet made of the component (A), (EVOH) alone in Comparative Example 12 has insufficient flexibility judging from the JIS D hardness as high as 84 and that the sheet made of the component (B) alone in Comparative Example 13 has insufficient gas-barrier properties as can be seen from the oxygen permeability as high as 5,700 cc·20 μm/m$^2$·day·atm.

EXAMPLE 16

Pellets were prepared by using the polymer composition similar to that obtained in Example 2. Those pellets were fed to an extruder for 3-kind-5-layer co-extrusion (preset temperature of the extruder for a polymer composition: 230° C.) under a nitrogen gas stream, whereby a 3-kind-5-layered film was produced. The film was stacked in the order of a high-density polyethylene layer, adhesive layer, polymer composition layer, adhesive layer and high-density polyethylene layer, when viewed from one side of the film. The thickness of each of the high-density polyethylene layers was about 60 µm, that of each of the adhesive layers (maleic acid modified polyethylene; "ADMER-NF 500", trade name; product of Mitsui Petrochemical Industries, Ltd.) was about 10 µm, and that of the polymer composition layer was about 10 µm.

The film so obtained was provided for a bending test using a gelbo-flex tester. When the bending frequency exceeded 3000, the first through-hole (pinhole) appeared.

COMPARATIVE EXAMPLE 14

In a similar manner to Example 16 except for the use of EVOH (U) alone instead of the polymer composition, co-extrusion was carried out, whereby a 3-kind-5-layered film formed of a high-density polyethylene layer (thickness: about 60 µm), an adhesive layer (thickness: about 10 µm), an EVOH layer (thickness: about 10 µm), an adhesive layer (thickness: about 10 µm) and a high-density polyethylene layer (thickness: about 60 µm) was produced.

As in Example 16 except that the film so obtained was used instead, bending test was carried out. When the bending frequency exceeded 50, the first through-hole (pinhole) appeared.

From the comparison between the film having the polymer composition layer of Example 16 according the present invention and the film having an EVOH layer of Comparative Example 14, it has been found that the former has largely improved flex resistance.

EXAMPLE 17

In a similar manner to Example 16, the polymer composition similar to that obtained in Example 2, a high-density polyethylene and an adhesive resin were subjected to co-extrusion, whereby a 3-kind-5-layered film formed of a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced.

The film so obtained was biaxially stretched using a tenter type biaxial stretcher under the conditions of a temperature of 70° C. and a draw ratio of 3×3. The film so stretched had good external appearance and good transparency without cracks, spots and ununiform section.

After a humidity was adjusted to 100% RH at 20° C., the oxygen permeability of the film was measured using a gas permeability measuring apparatus ("GTR-301", trade name; product of Yanagimoto Mfg. Co., Ltd.). As a result, it was 60 cc·20 µm/m² ·day·atm.

From the above results, it can be understood that the stretched film of this Example has excellent gas-barrier properties under the wet conditions.

EXAMPLE 18

In a similar manner to Example 16, the polymer composition similar to that obtained in Example 2, a high-density polyethylene and an adhesive resin were subjected to co-extrusion, whereby a 3-kind-5-layered film formed of a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced.

The film so obtained was cut into a rectangle of a predetermined size and two sides opposite to each other were heat sealed by a heat sealer to obtain a cylindrically-shaped film. One end of the cylindrically-shaped film was heat-sealed by a heat sealer, whereby a film bag (food packaging material) was produced. After the film bag was filled with a commercially-available miso, the opening of the bag was heat-sealed by a heat sealer, whereby the bag was hermetically closed. The miso enclosed in the bag was stored at room temperature for 3 months and then, the bag was opened to confirm the color tone and smell of the contents. As a result, no change was recognized.

EXAMPLE 19

In a similar manner to Example 16 except that the conditions such as die gap were changed, the polymer composition similar to that obtained in Example 2, a high-density polyethylene and an adhesive resin were subjected to co-extrusion, whereby a 3-kind-5-layered sheet formed of a high-density polyethylene layer (thickness: about 150 µm), an adhesive layer (thickness: about 20 µm), a polymer composition layer (thickness: about 20 µm), an adhesive layer (thickness: about 20 µm) and a high-density polyethylene layer (thickness: about 150 µm) was produced.

The film so obtained was cut into a disc. A glass-made bottle filled with orange juice was covered with a metal crown cap and with the disc as a packing (container packing), and the bottle was hermetically closed in a manner known per se in the art. After the orange juice hermetically packed in the glass bottle was stored at room temperature for 3 months, the crown was removed and the color tone and smell of the contents were confirmed. As a result, no change was observed.

EXAMPLE 20

Using a polymer composition similar to that obtained in Example 2, a film bag made of a 3-kind-5-layered film having a layer structure comprising a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced as in Example 18.

The film bag was filled with an infusion fluid. The opening of the bag was heat-sealed by a heat sealer, whereby the bag was hermetically closed. The infusion fluid was thereafter stored at 10° C. for three months. There was recognized no change in a result of gas chromatography, color tone, smell or the like of the contents.

From the above-described results, it has been found that the above polymer composition is useful as a material for a medical container for infusion fluid.

EXAMPLE 21

Using the polymer composition similar to that obtained in Example 2, pellets were prepared. Those pellets were fed to a multilayer direct blow molding equipment for 3-kind-5-layer co-extrusion (preset temperature of the extruder for a polymer composition: 230° C.), whereby a multilayered blow molding (a product having an internal volume of about 1.5 liters and being formed of a cylindrical body, a cylindrical head installed continuously to one end of the body and a bottom installed continuously to the other end of the body) comprising 5 layers of 3 kinds was manufactured. The blow molding had a layer structure comprising a high-density polyethylene layer, an adhesive layer, a polymer composition layer, an adhesive layer and a high-density polyethylene layer, when viewed from the outer surface side. At the body portion, each of the high-density polyethylene layers had a thickness of about 850 µm, each of the adhesive layers (maleic acid modified polyethylene; "ADMER-NF 500", trade name; product of Mitsui Petrochemical Industries, Ltd.) had a thickness of about 100 µm and the polymer composition layer had a thickness of about 100 µm. The blow molding had good external appearance and transparency without cracks, spots and ununiform section.

After the blow molding so obtained was filled with 1.0 liter of gasoline and was closed tightly, it was allowed to stand in a dark place under the conditions of 40° C. and 65% RH for one year. During that year, no odor leakage of gasoline occurred. Then, the blow molding was opened and gasoline was removed therefrom. The state of the blow molding was observed but no abnormalities such as cracks or quality change were recognized. Moreover, the collection amount of the gasoline was studied but no weight loss during storage was substantially recognized.

From the above-described results, it can be understood that the blow molding having a layer of the above polymer composition is useful as a container, storage tank or transfer pipe, each for organic liquids.

EXAMPLE 22

The polymer composition similar to that obtained in Example 2, a high-density polyethylene and an adhesive resin were co-extruded from a ring die and formed into a pipe, whereby a 3-kind-5-layered pipe (diameter: about 5 cm) comprising a high-density polyethylene layer (thickness: about 3 mm), an adhesive layer (thickness: about 0.5 mm), a polymer composition layer (thickness: about 0.5 mm), an adhesive layer (thickness: about 0.5 mm) and a high-density polyethylene layer (thickness: about 3 mm) was produced.

The pipe so obtained was cut into a predetermined length, which was used for one year as a hot-water pipe for heating. During that year, no hot water leakage owing to the generation of cracks or the like was recognized.

From the above-described results, it can be understood that the pipe having a layer composed of the above polymer composition is useful as a hot-water pipe for heating.

EXAMPLE 23

Using the polymer composition similar to that obtained in Example 2, pellets were produced. Those pellets were fed to a twin-screw extruder equipped with a T-die at 230° C. under a nitrogen gas stream, extruded at a screw revolution speed of 200 rpm, and then monoaxially stretched at a draw ratio of 3 at 70° C., whereby a film of 15 µm thick was obtained. Onto one side of the film, a two-part urethane base adhesive (product of Toyo Morton Co., Ltd.), which had been adjusted to have a main component "AD-585" having a solid content concentration of 20 wt. % and a hardening agent "CAT-10" at a weight ratio of 17:1, was applied by a gravure coater to give a coating weight of 2 g/m² based on the solid content, followed by drying at 110° C. for one minute. By the dry lamination method, the film so obtained was then stacked integrally on one side of a non-rigid polyvinyl chloride sheet, which contained 38 wt. % of a plasticizer (di-2-ethylhexyl phthalate) and had a thickness of 0.3 mm, under the temperature conditions of 110° C., with the adhesive applied side therebetween.

A portion of the laminate sheet so obtained was subjected to T-peel test. As a result, the polyvinyl chloride sheet layer was broken, from which the laminate sheet is found to have a sufficient adhesive strength.

Onto the surface of the laminate sheet on the side of the polymer composition film layer, a rigid polyvinyl chloride plate (plasticizer free) having a side of 6 cm and a thickness of 2 mm was closely placed and with a load of 2 kg being applied to the rigid polyvinyl chloride sheet, it was allowed to stand at 70° C. for 50 hours. After that, the weight of the rigid polyvinyl chloride plate and the surface condition of the laminate sheet on the side of the polymer composition film layer were studied, but neither weight change nor generation of stickiness on the surface was recognized. From the above results, it was confirmed that there occurred no bleeding of the plasticizer to the surface of the laminate sheet on the side of the polymer composition film layer.

The surface of the laminate sheet on the side of the polymer composition film layer was rubbed with a wet duster, but generation of damage on the surface was not recognized.

It can therefore be understood that the laminate sheet having a layer composed of the above polymer composition is useful as a resin-made wall paper.

EXAMPLE 24

Using the polymer composition similar to that obtained in Example 7, pellets were produced. Those pellets were fed to a twin-screw extruder equipped with a T-die at 230° C. under a nitrogen gas stream and extruded at a screw revolution speed of 200 rpm, whereby a sheet of 200 µm thick was prepared. The sheet was cut into a rectangle of a predetermined size. Two sides opposite to each other were heat sealed by a heat sealer to obtain a cylindrical sheet. One end of the cylindrical sheet was heat-sealed by a heat sealer, whereby a bag (food packaging material) was produced. After the bag so obtained was filled with commercially-available miso, the opening of the bag was heat-sealed by a heat healer whereby the bag was hermetically closed. The miso so enclosed in the bag was stored at room temperature for one month. The bag was then opened and the color tone and smell of the contents were observed. As a result, no change was recognized.

EXAMPLE 25

Using the polymer composition similar to that obtained in Example 7, pellets were produced. Those pellets were fed to a twin-screw extruder equipped with a T-die at 230° C. under a nitrogen gas stream and extruded at a screw revolution speed of 200 rpm, whereby a sheet of 300 µm thick was prepared. The sheet so obtained was cut into a disc. A glass-made bottle filled with orange juice was covered with a metal crown cap and with the disc as a packing (packing for container), and the bottle was hermetically sealed in a manner known per se in the art. After the orange juice hermetically packed in the glass bottle was stored at room temperature for 1 month, the crown cap was removed and the color tone and smell of the contents were confirmed. As a result, no change was observed.

EXAMPLE 26

In a similar manner to Example 24, a bag made of a polymer composition similar to that obtained in Example 7 was prepared. The bag so obtained was filled with an infusion fluid. The opening of the bag was heat-sealed by a heat sealer, whereby the bag was hermetically closed. The infusion fluid was thereafter stored at 10° C. for three months. There was recognized no change in a result of gas chromatography, color tone, smell or the like of the contents.

From the above-described results, it has been found that the above polymer composition is useful as a material for a medical container for infusion fluid.

EXAMPLE 27

Pellets were produced using the polymer composition similar to that obtained in Example 10. Those pellets were fed to a twin-screw extruder set at 230° C. under a nitrogen stream and were extruded at a screw revolution speed of 200 rpm from a ring die into a tube shape, whereby a tube of 450 µm thick was produced. The tube so obtained was cut into a predetermined length. Either end of the tube was heat-sealed, whereby a tire tube was produced.

The tube was filled with air and was left alone at room temperature. Even after 6 months, air pressure was almost maintained.

EXAMPLE 28

Using the polymer composition similar to that obtained in Example 10, pellets were prepared. Those pellets were fed to a twin-screw extruder equipped with a T-die at 230° C. under a nitrogen stream and were extruded at a screw revolution speed of 200 rpm, whereby a sheet of 1 mm thick was produced. Concerning the sheet so obtained, the temperature dependence (measured at −3° C. and 20° C.) of the values tan δ and E' at a distortion factor of 1% and 11 Hz was evaluated using a dynamic viscoelasticity measuring apparatus ("DVE RHEOSPECTOLER DVE-V4", trade name; product of RHEOLOGY CO. LTD.). In addition, the heat resistance was evaluated based on the retention rate of tensile strength (in accordance with JIS K 6301) of a JIS No. 3 dumbbell, which had been cut out from the sheet, after being left alone in a hot-air oven of 120° C. for 24 hours. The results are shown in below Table 5.

COMPARATIVE EXAMPLE 15

In a similar manner to Example 28 except a sheet made of a butyl rubber was used instead, the temperature dependence of the values tan δ and E' and also heat resistance were evaluated. The results are shown below in Table 5.

TABLE 5

|  | Tan δ | | $E' \times 10^{-6}$ | | Heat resistance \|tensile strength |
| --- | --- | --- | --- | --- | --- |
|  | −3° C. | 20° C. | −3° C. | 20° C. | retention (%)\| |
| Ex. 28 | 0.035 | 0.027 | 6.62 | 6.31 | 93 |
| Comp. Ex. 15 | 0.299 | 0.156 | 17.2 | 13.1 | 60 |

From Example 27, it has been found that the tire tube made of the polymer composition (C-2) embraced by the present invention has excellent long-term retention properties of air pressure. In addition, from Table 5, it has been found that the sheet made of the polymer composition (C-2) of Example 28 is superior in rolling friction at low temperature and at normal temperature and also in heat resistance to the sheet of Comparative Example 15 made of butyl rubber commonly used as a tire tube for bicycles (incidentally, rolling friction is generally said to be better when values of tan δ and E' are lower in the measurement of a dynamic viscoelasticity). From the above-described results, it can be understood that the polymer composition (C-2) embraced by the present invention is useful as a material for a tire tube for bicycles.

EXAMPLE 29

Pellets were prepared by using the polymer composition similar to that obtained in Example 12. Those pellets were fed to extruder for 3-kind-5-layer co-extrusion (preset temperature of the extruder for polymer composition: 230° C.) under a nitrogen gas stream, whereby a 3-kind-5-layered film was produced. The film was stacked in the order of a high-density polyethylene layer, adhesive layer, polymer composition layer, adhesive layer and high-density polyethylene layer, when viewed from one surface side of the film. The thickness of each of the high-density polyethylene layers was about 60 µm, that of each of the adhesive layers (maleic acid modified polyethylene; "ADMER-NF 500", product of Mitsui Petrochemical Industries, Ltd.) was about 10 µm, and that of the polymer composition layer was about 10 µm.

The film so obtained was provided for a bending test using a gelbo-flex tester. When the bending frequency exceeded 600, the first through-hole (pinhole) appeared.

COMPARATIVE EXAMPLE 16

In a similar manner to Example 29 except for the use of EVOH (S) alone instead of the polymer composition, co-extrusion was carried out, whereby a 3-kind-5-layered film formed of a high-density polyethylene layer (thickness: about 60 µm), an adhesive layer (thickness: about 10 µm), an EVOH layer (thickness: about 10 µm), an adhesive layer (thickness: about 10 µm) and a high-density polyethylene layer (thickness: about 60 µm) was produced.

As in Example 29 except that the film so obtained was used instead, a bending test was carried out. When the bending frequency exceeded 50, the first through-hole (pinhole) appeared.

From the comparison between the film having a layer of the polymer composition of Example 29 according the present invention and the film having an EVOH layer of Comparative Example 16, it has been found that the former has largely improved flex resistance.

EXAMPLE 30

In a similar manner to Example 29, the polymer composition similar to that obtained in Example 12, a high-density polyethylene and an adhesive resin were co-extruded, whereby a 3-kind-5-layered film comprising a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced.

The film so obtained was biaxially stretched using a tenter type biaxial stretcher under the conditions of a temperature of 70° C. and a draw ratio of 3×3. The film so stretched had good external appearance and good transparency without cracks, spots and ununiform section.

After humidity was adjusted to 100% RH at 20° C., the oxygen permeability of the film was measured using a gas permeability measuring apparatus ("GTR-30", trade name; product of Yanagimoto Mfg. Co., Ltd.). As a result, it was 400 cc·20 µm/m²·day·atm.

From the above results, it can be understood that the stretched film of this Example has excellent gas-barrier properties under the wet conditions.

EXAMPLE 31

In a similar manner to Example 29, the polymer composition similar to that obtained in Example 12, a high-density polyethylene and an adhesive resin were subjected to co-extrusion, whereby a 3-kind-5-layered film formed of a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced.

The film so obtained was cut into a rectangle of a predetermined size and opposite sides of the film were heat sealed by a heat sealer to obtain a cylindrically-shaped film. One end of the cylindrically-shaped film was heat-sealed by a heat sealer, whereby a film bag (food packaging material) was produced. After the film bag was filled with a commercially-available miso, the opening of the bag was heat-sealed by a heat sealer, whereby the bag was hermetically closed. The miso enclosed in the bag was stored at room temperature for one month and then, the bag was opened to confirm the color tone and smell of the contents. As a result, no change was recognized.

EXAMPLE 32

In a similar manner to Example 29 except that the conditions such as die gap were changed, the polymer composition similar to that obtained in Example 12, a high-density polyethylene and an adhesive resin were subjected to co-extrusion, whereby a 3-kind-5-layered film formed of a high-density polyethylene layer (thickness: about 150 µm), an adhesive layer (thickness: about 20 µm), a polymer composition layer (thickness: about 20 µm), an adhesive layer (thickness: about 20 µm) and a high-density polyethylene layer (thickness: about 150 µm) was produced.

The film so obtained was cut into a disc. A glass-made bottle filled with orange juice was covered with a metal crown cap and with the disc as a packing (packing for container), and the bottle was hermetically sealed in a manner known per se in the art. After the orange juice hermetically packed in the glass bottle was stored at room temperature for one month, the crown was removed and the color tone and smell of the contents were confirmed. As a result, no change was observed.

EXAMPLE 33

In a similar manner to Example 31, a film bag made of a 3-kind-5-layered film having a layer structure comprising a high-density polyethylene layer (thickness: about 60 µm), an adhesive layer (thickness: about 10 µm), a polymer composition layer (thickness: about 10 µm), an adhesive layer (thickness: about 10 µm) and a high-density polyethylene layer (thickness: about 60 µm) was produced.

The film bag was filled with an infusion fluid. The opening of the bag was heat-sealed by a heat sealer, whereby the bag was hermetically closed. The infusion fluid thus hermetically packed was thereafter stored at 10° C. for one month. There was recognized no change in a result of gas chromatography, color, smell or the like of the contents.

From the above-described results, it has been found that the above polymer composition is useful as a material for a medical container for infusion fluid.

EXAMPLE 34

Using the polymer composition similar to that obtained in Example 12, pellets were prepared. Those pellets were fed to a multilayer direct blow molding equipment for 3-kind-5-layer co-extrusion (preset temperature of the extruder for a polymer composition: 230° C.), whereby a multilayered blow molding (a product having an internal volume of about 1.5 liters and being formed of a cylindrical body, a cylindrical head installed continuously to one end of the body and a bottom installed continuously to the other end of the body) comprising 5 layers of 3 kinds was manufactured. The blow molding had a layer structure comprising a high-density polyethylene layer, an adhesive layer, a polymer composition layer, an adhesive layer and a high-density polyethylene layer, when viewed from the outer surface side. At the body portion, each of the high-density polyethylene layers had a thickness of about 850 µm, each of the adhesive layers (maleic acid modified polyethylene; "ADMER-NF 500", trade name; product of Mitsui Petrochemical Industries, Ltd.) had a thickness of about 100 µm and the polymer composition layer had a thickness of about 100 µm. The blow molding had good external appearance and good transparency without cracks, spots and ununiform section.

After the blow molding so obtained was filled with 1.0 liter of gasoline and was hermetically closed, it was allowed to stand in a dark place for three months under the conditions of 40° C. and 65% RH. During those months, no odor leakage of gasoline occurred. Then, the blow molding was opened and gasoline was removed therefrom. The state of the blow molding was observed but no abnormalities such as cracks or quality change were recognized. In addition, the collected amount of the gasoline was studied but no weight loss during storage was substantially recognized.

From the above-described findings, it can be understood that the blow molding having a layer of the above polymer composition is useful as a container, storage tank or transfer pipe, each for organic liquids.

EXAMPLE 35

The polymer composition similar to that obtained in Example 12, a high-density polyethylene and an adhesive resin were co-extruded from a ring die and formed into a pipe, whereby a 3-kind-5-layered pipe (diameter: about 5 cm) comprising a high-density polyethylene layer (thickness: about 3 mm), an adhesive layer (thickness: about 0.5 mm), a polymer composition layer (thickness: about 0.5 mm), an adhesive layer (thickness: about 0.5 mm) and a high-density polyethylene layer (thickness: about 3 mm) was produced.

The pipe so obtained was cut into a predetermined length, which was used for one year as a hot-water pipe for heating. During that year, no hot water leakage owing to the generation of cracks or the like was recognized.

From the above-described finding, it can be understood that the pipe having a layer composed of the above polymer composition is useful as a hot-water pipe for heating.

EXAMPLE 36

Using the polymer composition similar to that obtained in Example 12, pellets were produced. Those pellets were fed to a twin-screw extruder equipped with a T-die at 230° C. under a nitrogen gas stream, extruded at a screw revolution speed of 200 rpm, and then monoaxially stretched at a draw ratio of 3 at 70° C., whereby a film of 15 µm thick was obtained. Onto one side of the film, a two-part urethane base adhesive (product of Toyo Morton Co., Ltd.) in which "AD-585", as a main component, having a solid content concentration of 20 wt. % and "CAT-10" as a hardening agent had been mixed at a weight ratio of 17:1, was applied by a gravure coater to give a coating weight of 2 g/m² (based on the solid content), followed by drying at 110° C. for one minute. By the dry lamination method, the film so obtained was then stacked integrally on one side of a non-rigid polyvinyl chloride sheet containing 38 wt. % of a plasticizer (di-2-ethylhexyl phthalate) and having a thickness of 0.3 mm under the temperature conditions of 110° C., with the adhesive applied side therebetween.

A portion of the laminate sheet so obtained was subjected to T-peel test. As a result, the polyvinyl chloride sheet layer was broken. From the result, it has been found that the laminate sheet has a sufficient adhesive strength.

Onto the surface of the laminate sheet on the side of the polymer composition film layer, a rigid polyvinyl chloride plate (plasticizer free) having a side of 6 cm and a thickness of 2 mm was closely placed, and with a load of 2 kg being applied to the rigid polyvinyl chloride sheet, it was allowed to stand at 70° C. for 50 hours. After that, the weight of the rigid polyvinyl chloride plate and the surface condition of the laminate sheet on the side of the polymer composition film layer were studied, but neither weight change nor generation of stickiness on the surface was recognized. From the findings, it has been confirmed that there occurs no bleeding of the plasticizer to the surface of the laminate sheet on the side of the polymer composition film layer.

The surface of the laminate sheet on the side of the polymer composition film layer was rubbed with a wet duster, but occurrence of damage on the surface was not recognized.

From the above-described findings, it can be understood that the laminate sheet having a layer composed of the above polymer composition is useful as a resin-made wall paper.

What is claimed is:

1. A polymer composition:
   (1) which comprises as the main components the following components (A) and (B):
      Component (A): an ethylene-vinyl alcohol base copolymer having an ethylene unit content of 10 to 75 mol %, and
      Component (B): a block copolymer which has a polymer block (b1) containing an aromatic vinyl monomer unit and a polymer block (b2) containing an isobutylene unit, and
   (2) in which a phase composed of said component (A) and a phase composed of said component (B) are separated from each other.

2. A polymer composition according to claim 1, wherein the sum of the contents of the components (A) and (B) in the polymer composition is at least 55 wt. % and the weight ratio of the component (A) to the component (B) falls within a range of 99:1 to 5:95.

3. A polymer composition according to claim 1, wherein the phase composed of the component (A) forms a matrix phase and the phase composed of the component (B) forms a dispersed particle phase.

4. A polymer composition according to claim 3, wherein the sum of the contents of the components (A) and (B) in the polymer composition is at least 95 wt. % and the weight ratio of the component (A) to the component (B) falls within a range of 99:1 to 25:75.

5. A polymer composition according to claim 1, wherein the phase composed of the component (A) forms a dispersed particle phase and the phase composed of the component (B) forms a matrix phase.

6. A polymer composition according to claim 5, wherein the sum of the contents of the components (A) and (B) in the polymer composition is at least 55 wt. % and the weight ratio of the component (A) to the component (B) falls within a range of 50:50 to 5:95.

7. A polymer composition according to claim 1, wherein the phase composed of the component (A) and the phase composed of the phase (B) are distributed, forming an interpenetrating network structure.

8. A polymer composition according to claim 7, wherein the sum of the contents of the components (A) and (B) in the polymer composition is at least 55 wt. % and the weight ratio of the component (A) to the component (B) falls within a range of 85:15 to 15:85.

9. A molded or formed product made of the polymer composition as claimed in claim 1.

* * * * *

UNITED STATES PATENT AND TRADEMARK OFFICE
CERTIFICATE OF CORRECTION

PATENT NO. : 5,895,797

DATED : April 20, 1999

INVENTOR(S): Hiroshi HAYASHIHARA, et al.

It is certified that an error appears in the above-identified patent and that said Letters Patent is hereby corrected as shown below:

On the title page, item [30], should be inserted as follows;

--[30]    Foreign Application Priority Data
    Jun. 18, 1996 [JP] Japan ............... 8-177477
    Jun. 18, 1996 [JP] Japan ............... 8-177478
    Jun. 18, 1996 [JP] Japan ............... 8-177479--

Signed and Sealed this

Eleventh Day of April, 2000

Attest:

Q. TODD DICKINSON

Attesting Officer     Director of Patents and Trademarks